(No Model.)  3 Sheets—Sheet 1.

R. H. YALE.
BAGASSE DRIER.

No. 294,836. Patented Mar. 11, 1884.

WITNESSES:
T. S. West,
Wm. T. Emerson.

INVENTOR:
R. H. YALE,
BY H. W. Beadle & Co.
ATTYS.

(No Model.)
R. H. YALE.
BAGASSE DRIER.
No. 294,836.
Patented Mar. 11, 1884.
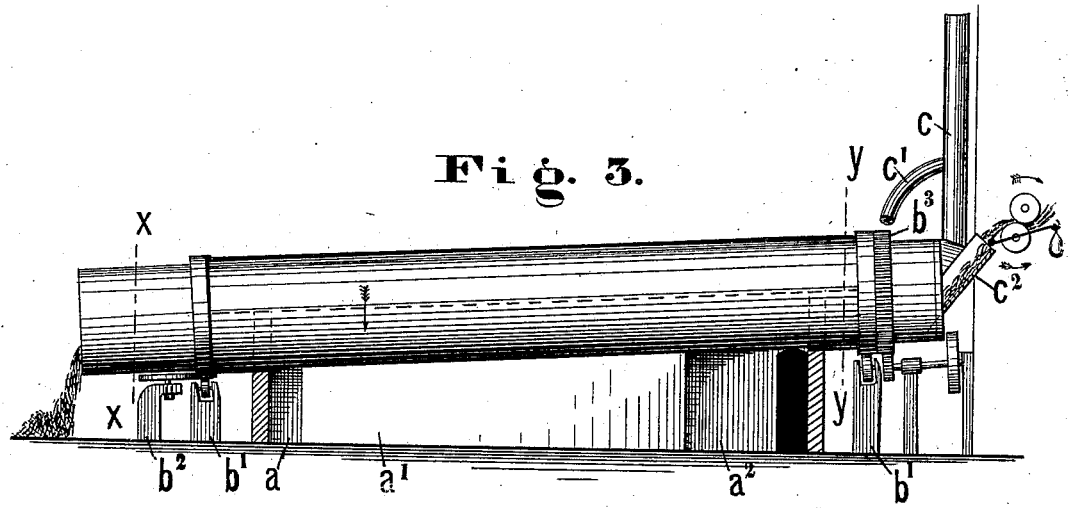
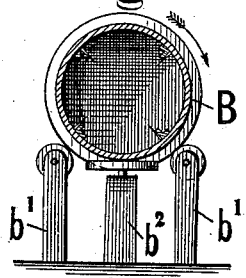
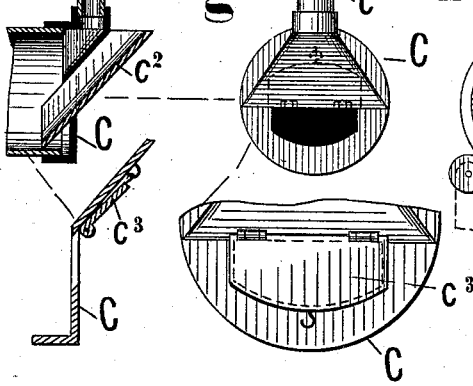
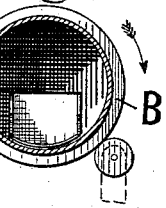
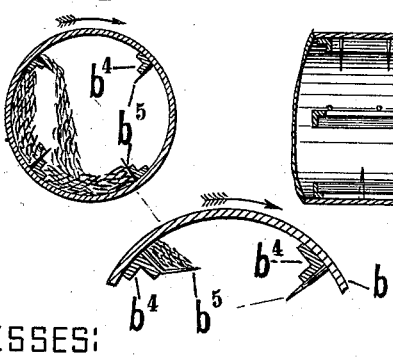
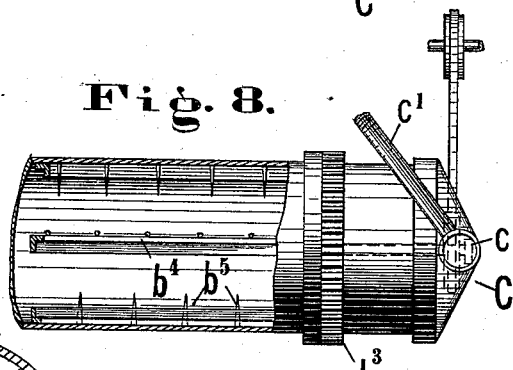
WITNESSES:
T. S. West,
Wm. T. Emerson.
INVENTOR:
R. H. YALE,
BY H. W. Beadle & Co
ATTYS.

(No Model.)  3 Sheets—Sheet 3.

R. H. YALE.
BAGASSE DRIER.

No. 294,836.  Patented Mar. 11, 1884.

WITNESSES:
T. S. West,
Wm. T. Emerson.

INVENTOR:
R. H. YALE,
BY H. W. Beadle & Co.
ATTYS.

United States Patent Office.

RICHARD H. YALE, OF NEW ORLEANS, LOUISIANA.

BAGASSE-DRIER.

SPECIFICATION forming part of Letters Patent No. 294,836, dated March 11, 1884.

Application filed May 21, 1883. (No model.)

*To all whom it may concern:*

Be it known that I, RICHARD H. YALE, of New Orleans, parish of Orleans, and State of Louisiana, have invented a new and useful Improvement in the Methods of and Apparatus for Treating Bagasse; and I do hereby declare that the following is a full and exact description of the same, reference being had to the accompanying drawings, and to the letters of reference marked thereon.

This invention consists in a certain method of treating bagasse to fit it for fuel, and in certain appliances for carrying the method practically into effect, as will be fully described hereinafter.

Figure 1:
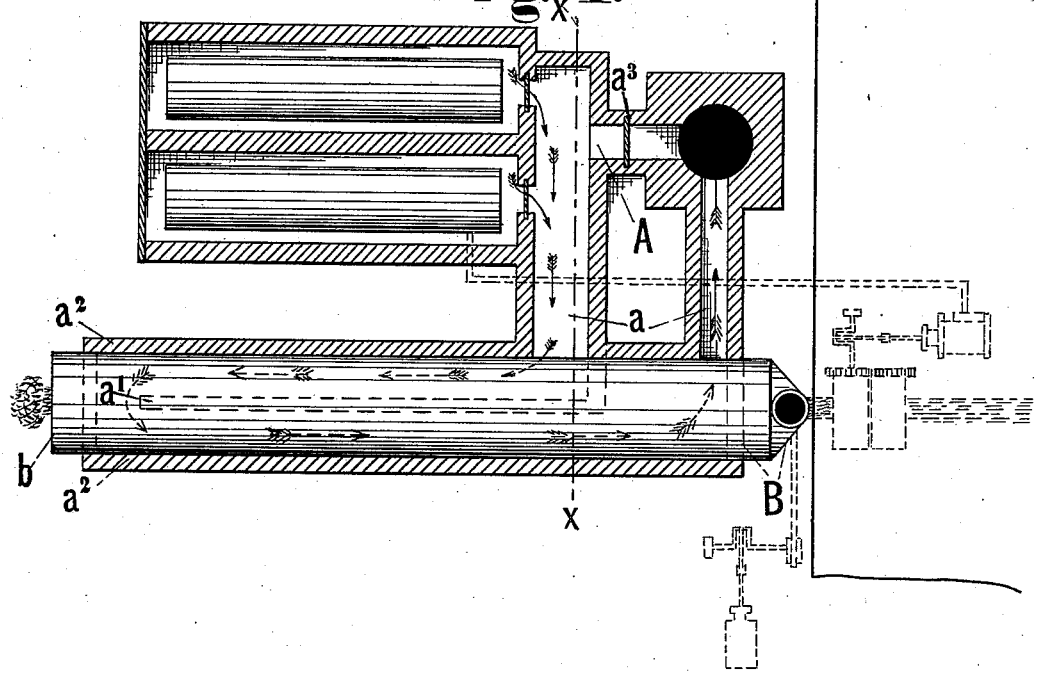
Figure 2:
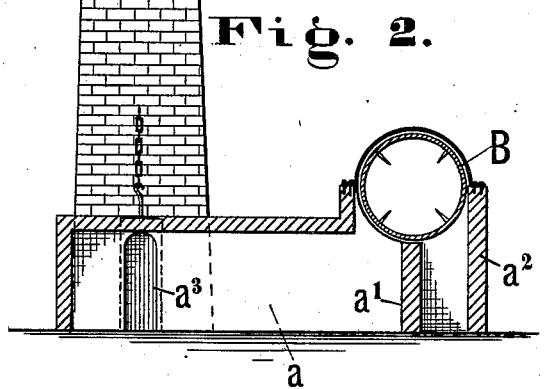
Figure 9:
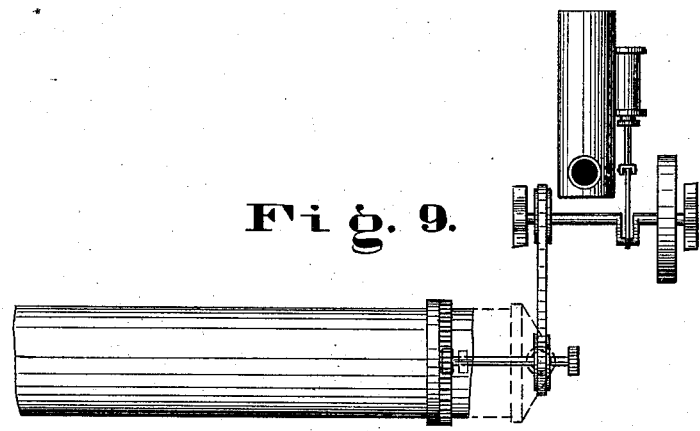
Figure 10:
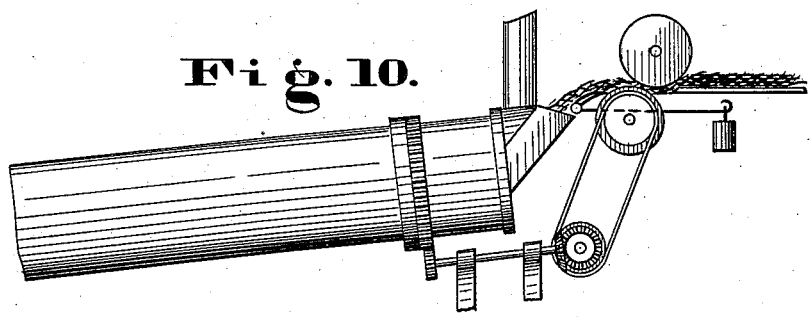
Figure 11:
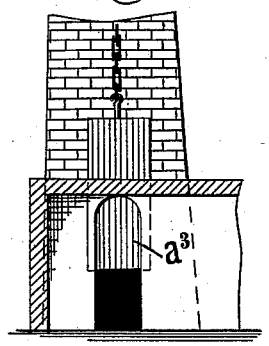

In the drawings, Figure 1 represents a plan view of a system of appliances for carrying the method practically into effect, consisting of a main flue from any proper furnace leading directly into the chimney, an auxiliary flue leading indirectly to the chimney, and a drier located in the auxiliary flue; Fig. 2, a transverse section on the line X X, Fig. 1; Fig. 3, a side elevation of the drier with one wall cut away to show the interior of the auxiliary flue; Fig. 4, a transverse section of the drying-cylinder, taken on the line X X, Fig. 3; Fig. 5, various views of the upper end of the cylinder and the permanent head, by means of which the end of the cylinder is closed; Fig. 6, a transverse section of the drying-cylinder, taken on the line y y, Fig. 3; Fig. 7, views illustrating the operation of the cylinder as it revolves; Fig. 8, a plan view of the upper end of the cylinder, partially broken away to show the interior construction; Fig. 9, a plan view illustrating the employment of a special engine to run the drier; Fig. 10, a side view illustrating the employment of power from the mill to run the drier; and Fig. 11, a sectional view, showing the regulating-damper partially raised to permit a portion of the heat to escape directly up the chimney.

To enable others skilled in the art to understand my method and to carry it practically into effect, I will proceed to describe the same fully in connection with the appliances employed in connection therewith.

A general statement of the method may be made as follows: The bagasse, after it leaves the mill, is subjected to the action of heat, not directly applied thereto, but indirectly through a protecting medium, and to the action of an air-current directly applied thereto, while the bagasse itself is in a state of agitation. By means of this method the wet bagasse, as it comes from the mill, is dried very rapidly without danger of setting the same on fire.

The appliances employed in the practical application of this method will now be described.

A, Fig. 1, represents the main flue of a boiler-furnace of any proper construction, which leads directly to the chimney, as shown.

$a$ represents an auxiliary flue leading indirectly to the chimney by means of a passageway extending about the partition $a'$ in the chamber formed by the walls $a^2 a^2$, as shown.

$a^3$ represents a damper, by means of which the entrance of heat into the auxiliary flue $a$ is properly controlled.

B, Figs. 1, 2, and 3, represents a drier consisting of a sheet-iron cylinder, $b$, of any proper diameter and length, which is supported in an inclined position over the auxiliary flue upon any proper standards, $b' b'$, having friction-rollers, as shown.

$b^2$ represents a standard having a horizontal friction-roller, by means of which the cylinder is held against longitudinal displacement.

$b^3$ represents a band of gearing near the upper end of the cylinder, adapted to engage with gearing from any proper power-machine located at any proper point. By means of this construction the cylinder is given proper revolution upon its friction-bearings.

$b^4 b^4$, Figs. 7 and 8, represent angle-irons extending longitudinally through the cylinder, for the double purpose of stiffening the same and serving as lifting-ribs in connection with the straight and bent pins $b^5$, for carrying up the bagasse, as shown in Fig. 7.

C, Figs. 5 and 8, represents a head adapted to close the upper end of the cylinder, which is rigidly held by any proper means of support.

$c$ represents an air-flue extending from the head, as shown, into the chimney, into which discharges the exhaust-pipe $c'$, as shown in Figs. 3 and 8.

$c^2$ represents a chute leading into the upper end of the cylinder through a proper opening, as shown, by means of which the bagasse from the mill is conducted into the cylinder, as shown in Fig. 3.

$c^3$ represents a door, of any proper construction, in the head, by means of which the upper end of the cylinder may be tightly closed, if desired.

The drier may receive movement from that source or power which runs the grinding-mill, or directly from a special engine, as shown in Fig. 9, or directly from the grinding-mill itself, as shown in Fig. 10.

The general operation is substantially as follows: The wet bagasse, as it comes from the mill, is discharged through the chute into the drying-cylinder, and by the revolution of the latter is conveyed through the same to the lower end and discharged upon the ground prepared for fuel adjacent to the furnace, and in convenient position to be introduced therein. The heat from the auxiliary flue is indirectly applied to the passing bagasse through the shell of the cylinder, and the air-current resulting from the escape of the exhaust into the air-flue is directly applied to the same through the entire length of the cylinder, the bagasse itself being in a continual state of agitation, as shown in Fig. 7. The bagasse, it will be understood, is received directly into the drier from the mill, as shown in Figs. 3 and 10, and hence the latter must have a capacity for drying the bagasse and discharging the same which will at least equal the capacity of the mill. Its capacity for drying is determined by the amount of heat passing through the auxiliary flue, according to the position of the regulating-damper $c^5$, Figs. 1, 2, and 11, and by the speed of the revolution of the cylinder and the strength of the air-current. Its capacity for discharging is determined by the inclination of the cylinder, the diameter of the same, and the speed of its revolution.

By the employment of a special engine, as shown in Fig. 9, to actuate the drier, it is possible to vary the speed of the same to suit the special circumstances of the case without affecting at all the operation of the mill. The drier, however, may be driven directly by the mill, as shown in Fig. 10; but in such a case proper means must be provided to change the speed of the drier relatively to that of the mill.

It is desirable that the drier shall be located near the furnace, as shown in Fig. 1, for the purpose of utilizing the waste heat escaping therefrom by means of an auxiliary flue, as described; but the mill, if desired, may be located at a distance, and the bagasse be brought to the drier by an endless carrier in the manner well understood.

If desired, the auxiliary flue may be constructed of sheet-iron instead of brick, as shown.

Some of the advantages of the described construction are as follows: By the employment of a main and auxiliary flue in connection with a drier, in the manner described, the waste heat from the furnace is utilized, and the bagasse, otherwise an objectionable product, is converted into a valuable fuel. By means of the auxiliary flue and its regulating-damper it is possible to expose the bagasse in its passage through the cylinder to just that amount of heat which will fit it for fuel, it being important that it should be neither too dry nor too wet. By the employment of a special motor to revolve the drier it is given a capacity to carry off all the product of the mill delivered thereto without regard to the precise amount. By the employment of the special motor in connection with the regulating-damper of the auxiliary flue it is possible to carry off all the product of the mill, whether it is large or small, and still expose it to that amount of heat which will best fit it for fuel. By means of the general construction described, a circulating system is in effect established, as follows: The boilers furnish power to run the grinding-mill, the grinding-mill, being supplied with cane, furnishes bagasse to the drier, and the drier furnishes fuel to the boilers. If from any cause the bagasse should take fire, the flames will be permitted to pass off to the chimney without injury by simply closing the door $c^3$.

I do not confine myself to the special arrangement shown in Figs. 1, 2, and 3 of the relative positions of the drier B and auxiliary flue with the boilers and main waste-heat flue, as it is obvious that the drier B and auxiliary flue may be directly over or under the main waste-heat flue; or the two flues may be alongside of each other, and both flues could discharge into same side of chimney, which could be placed near the discharging end of drier B; or the arrangement could be otherwise varied to suit circumstances; but in all cases I arrange it essentially so that the drier B may be set in an auxiliary flue, and be surrounded partially or entirely by a part of or all of the waste heat, for the purpose of causing evaporation of the moisture contained in the damp bagasse as it passes through the drier, as described.

I am aware that it is old to use bagasse for fuel by means of furnaces specially adapted for the purpose.

I am also aware that it is old to treat bagasse to fit it for fuel by exposing the same for a limited period to the rays of the sun; also, to treat the same by exposing it in a revolving cylinder directly to the products of combustion discharging from a furnace; also, to treat the same by exposing it in a revolving cylinder to steam heat externally applied.

I am aware, also, that other substances have been dried in a revolving cylinder located in an oven.

Having thus fully described my invention, what I claim as new, and desire to secure by Letters Patent, is—

1. In the art of treating bagasse for fuel, the combination of the following elements: a cylinder the metal surface of which is directly exposed to fire heat, means, substantially as described, for causing a positive air-current to pass directly through the cylinder, and means, substantially as described, for agitating the contents of the cylinder.

2. In combination with an auxiliary flue, $a$, located away from the furnace and main flue, and adapted to take the waste heat from the furnace, a drier, B, located in the auxiliary flue, and having the products of combustion from the furnace directly applied to its external surface, as and for the purpose described.

3. In combination with the drier B, the auxiliary flue $a$, having the walls $a^2 a^2$ and partition $a'$, the flues being located below the drier, as set forth.

4. In combination with a drier adapted to revolve at varying speeds, an air-flue, $c$, having the exhaust-pipe $c'$ leading into the same.

5. The combination of the following elements: a grinding-mill, a revolving drier adapted to receive bagasse directly from the mill, an auxiliary motor for actuating the drier independently of the mill, and means, substantially as described, for regulating the heat-supply delivered to the drier, substantially as set forth.

6. The inclined drier B, having a capacity for revolution as described, in combination with the fixed head C, having the air-flue $c$ and the chute $c^2$, as described.

7. The drier B, having the head C, with flue $c$, chute $c^2$, and door $c^3$, adapted to tightly close the cylinder when the chute is removed, as described.

This specification signed and witnessed.

R. H. YALE.

Witnesses:
H. W. BEADLE,
WM. T. EMERSON.